United States Patent [19]
Strong

[11] Patent Number: 5,193,597
[45] Date of Patent: Mar. 16, 1993

[54] MATERIAL STRIPPER AND DEBRIS REMOVAL APPARATUS THEREFOR

[75] Inventor: Donald E. Strong, Remus, Mich.

[73] Assignee: Strong Manufacturing Company, Remus, Mich.

[21] Appl. No.: 750,182

[22] Filed: Aug. 26, 1991

[51] Int. Cl.$^5$ ............................. B27L 7/00; B27L 1/00
[52] U.S. Cl. .................................. 144/208 J; 144/2 Z;
144/3 R; 144/176; 144/252 A; 144/337;
144/341; 144/370; 241/55; 241/56; 241/194
[58] Field of Search .................... 144/3 R, 2 Z, 252 P,
144/208 R, 208 J, 176, 252 A, 337, 341, 370;
241/55, 56, 194, 236

[56] References Cited

U.S. PATENT DOCUMENTS

| | | |
|---|---|---|
| 1,597,332 | 8/1926 | Waddell et al. |
| 2,461,924 | 2/1949 | Robertson |
| 2,601,261 | 6/1952 | Carpenter |
| 2,792,860 | 5/1957 | Watkins |
| 3,223,129 | 12/1965 | Nicholson |
| 3,356,116 | 12/1967 | Brundell et al. |
| 3,524,485 | 8/1970 | Smith |
| 3,545,692 | 12/1970 | Burkett |
| 3,601,324 | 8/1971 | Brown |
| 3,661,333 | 5/1972 | Smith |
| 3,688,821 | 9/1972 | McCol |
| 3,752,409 | 8/1973 | Lewis |
| 3,844,489 | 10/1974 | Strong |
| 3,955,765 | 5/1976 | Gaitten |
| 4,023,604 | 5/1977 | Stadnick |
| 4,061,166 | 12/1977 | Larson |
| 4,078,590 | 3/1978 | Smith |
| 4,172,481 | 10/1979 | Brisson |
| 4,214,616 | 7/1980 | Brisson |
| 4,220,184 | 9/1980 | Hallett et al. |
| 4,222,418 | 9/1980 | McCray et al. |
| 4,368,764 | 1/1983 | Peterson et al. |
| 4,534,390 | 8/1985 | Morey et al. |
| 4,572,258 | 2/1986 | Mischel |
| 4,640,325 | 2/1987 | Vaders |
| 4,654,938 | 4/1987 | Dalseide |
| 4,690,187 | 9/1987 | Schmidt |
| 4,711,280 | 12/1987 | Schmidt |
| 4,719,950 | 1/1988 | Peterson et al. |
| 4,721,139 | 1/1988 | Peterson et al. |
| 4,729,415 | 3/1988 | Peterson et al. |
| 4,738,292 | 4/1988 | Turpeinen |
| 4,787,431 | 11/1988 | Demlow |
| 4,889,169 | 12/1989 | Peterson et al. |

FOREIGN PATENT DOCUMENTS

| | | |
|---|---|---|
| 598362 | 5/1960 | Canada |
| 624646 | 1/1936 | Fed. Rep. of Germany |
| 1217449 | 5/1960 | France |
| 251293 | 8/1969 | U.S.S.R. |
| 640706 | 1/1979 | U.S.S.R. |
| 640843 | 1/1979 | U.S.S.R. |

OTHER PUBLICATIONS

Hydro-Ax Model LL 64 Specification Sheet.
Hydro-Ax Model 500/1000 Specification Sheet.
"CIP Beats Delimbing Costs With Chains," Pulp & Paper Magazine of Canada, Sep., 1975.
American Society of Agricultural Engineers, Paper No. 75-1590, entitled "What Multi Stem Chain Flail Delimbing Has Done for the Pulp and Paper Industry", Dec., 1975.

*Primary Examiner*—W. Donald Bray
*Attorney, Agent, or Firm*—Price, Heneveld, Cooper, DeWitt & Litton

[57] ABSTRACT

A debris conveyor for removing limbs, bark and other debris from between a tree stripping apparatus and a tree chipping apparatus defines a path between the stripper and chipper and comprises a conveyor extending under the path for conveying debris away from between the stripper and chipper. In one aspect of the invention, the conveyor is provided with wheels and a frame adapted for trailering. In one embodiment of the invention, the conveyor includes a power source for powering the conveyor. In an alternative embodiment, the conveyor is adapted for connection with the power source from one of the stripper and the chipper. The stripper incluldes, in one embodiment a serpentine drive system for controlling stripping elements.

38 Claims, 10 Drawing Sheets

MATERIAL STRIPPER AND DEBRIS REMOVAL APPARATUS THEREFOR

BACKGROUND OF THE INVENTION

The present invention generally relates to wood chip production and specifically to a power transmission for a material stripping or delimbing apparatus and to the removal of debris which typically accumulates between the material stripping apparatus and a material chipping apparatus at a chip production site.

In wood chip production, a chip production site typically includes a material stripping apparatus for removal of limbs and bark, and a material chipping apparatus for chip production from the delimbed and debarked trees. There apparatus will typically be set up in an area of forest where trees will be cut down for chip production. The stripper and chipper will commonly be arranged with respect to each other so that material will feed directly into the chipper from the stripper. A semitrailer is usually positioned adjacent the chipper for receiving finished chips.

The stripper removes limbs, bark, and dirt or the like from trees to improve the quality of the chips produced. This debris, removed by the stripper, is typically discarded. While many strippers provide for removal of the debris from the stripper, the debris typically accumulates between the stripper and chipper and is commonly carried out of the stripper by the flow of the stripped material itself. Thus, the stripper and chipper will typically be spaced approximately five feet apart so that debris can fall from the flow path of material before entering the chipper.

A common type of stripper is the chain flail delimber which uses rotating stripping elements having a series of chain lengths, rotating about a drive shaft, to flail passing material and remove limbs, bark, dirt and debris prior to chipping. However, lengths or portions of the flail chains sometimes break off and are carried out of the stripper with the material. Thus, another reason for providing a gap between the stripper and chipper is to allow these chain portions to fall from the trees prior to entering the chipper. If these chain portions enter the chipper, damage to the chipper may occur and significant repair to the chipper is required. This results in costly down time for the production facilities as well as labor and material costs directly for the repair.

A common procedure for operation at a chip production site is to use a tow vehicle or skidder to drag cut trees out of the forest to the infeed side of the stripper. A crane device is used to pick up and feed the trees or material into the stripper, which will typically have a material transfer device for moving material through the stripper. As indicated above, the material will exit the stripper, carrying a variety of debris, generated by the stripping process, and enter the chipper. As production continues, debris accumulates between the stripper and chipper which is periodically removed by the skidder and is typically dispersed in the forest as the skidder goes to get another load of material. However, because the debris between the stripper and the chipper is not continuously removed and because effective removal of this debris with the skidder is difficult, the debris will typically accumulate between the stripper and chipper to the point where debris carried out of the stripper can not fall from the material and is carried into the chipper.

When debris is fed into the chipper, the debris intermixes with the chips and poor quality chips are produced. Also, portions of chain can be carried into the chipper where they will damage the chipper, specifically the chipper knives, requiring additional maintenance of the chipper and reducing production. Further, requiring the skidder operator to clear debris from between the stripper and chipper distracts the skidder from its primary function of conveying cut trees from the forest to the production site and decreases the efficiency of the production operation.

Another problem in chip production arises from the common use of hydraulic power transmission between the operating engine for the stripper and the stripping elements, commonly rotating flails. While hydraulic pumps and motors provide convenient and flexible power transmission for the large amount of power required to drive the stripping elements, especially as compared to the complexities of shaft drives, hydraulic transmission of such large quantities of power generates commensurate amounts of heat. Since chipping operations are conducted during the summer months of the year and quite frequently in the southern regions in the country, the heat generation of hydraulic power transmission frequently causes overheating of the powering system, requiring frequent shut downs while the heat dissipates and the power system cools. More importantly, such overheating typically damages the hydraulic transmission system and results in significant additional maintenance and repair costs.

Further, there are significant transmission losses in converting engine power to hydraulic power and then converting the hydraulic power to the rotary motion of the flails. When viewed in light of historically escalating fuel costs and environmental concerns regarding the consumption of fossil fuel, an increase in power transmission efficiency between the engine and the stripping element is readily seen to have significant advantages.

SUMMARY OF THE INVENTION

The present invention addresses the above identified inefficiencies and concerns in wood chip production by providing a material stripping apparatus having a serpentine belt drive for efficiently transmitting operating power and by providing a debris removal apparatus for use between the stripper and a chipping apparatus. A debris removal apparatus according to the present invention includes a housing which defines a path from the stripper to the chipper and includes a debris conveyor which extends away from the path, from under the path. In one aspect of the invention, the debris conveyor has a first portion which moves debris from under the path to a second portion and the second portion moves debris generally away from between the stripper and the chipper.

In another aspect of the invention, the debris removal apparatus includes a material transfer apparatus for assisting in feeding desired material through the debris removal area. In an alternative aspect of the invention, the debris removal apparatus includes a clearing device to clear clogged debris. In yet another aspect of the invention, the debris removal apparatus may be connected with a power source of one of the stripper or chipper. In an alternative embodiment of the debris removal apparatus, a power source is provided for the debris removal apparatus.

A serpentine belt drive for a material stripper according to the present invention provides counter-rotation of stripper elements on opposing sides of a material flow path through the stripper. In one aspect of the invention, a belt tensioning device provides an auxiliary power take off which may be used to power the debris removal apparatus.

The present invention provides increased efficiency of power transmission for material strippers and provides a unique debris removal apparatus to generally enhance the performance of chip production by effectively removing debris which accumulates between the stripper and chipper on a chip production site. Further, by using a common power source for the stripper and debris removal apparatus, the present invention offers additional efficiencies of operation.

Use of the present invention will also increase chip production quality, reduce chipper maintenance requirements, and enhance skidder operation or material retrieval. Further, production site safety is enhanced by use of the present invention insofar as access to the material flow path during production by production site personnel is limited since any requirement for close proximity between personnel and the material flow path for the purpose of removing debris is minimized.

These and other objects, advantages and features of the present invention will become apparent upon review of the following specification in conjunction with the accompanying drawings.

DESCRIPTION OF THE PREFERRED EMBODIMENT

Figure 1:
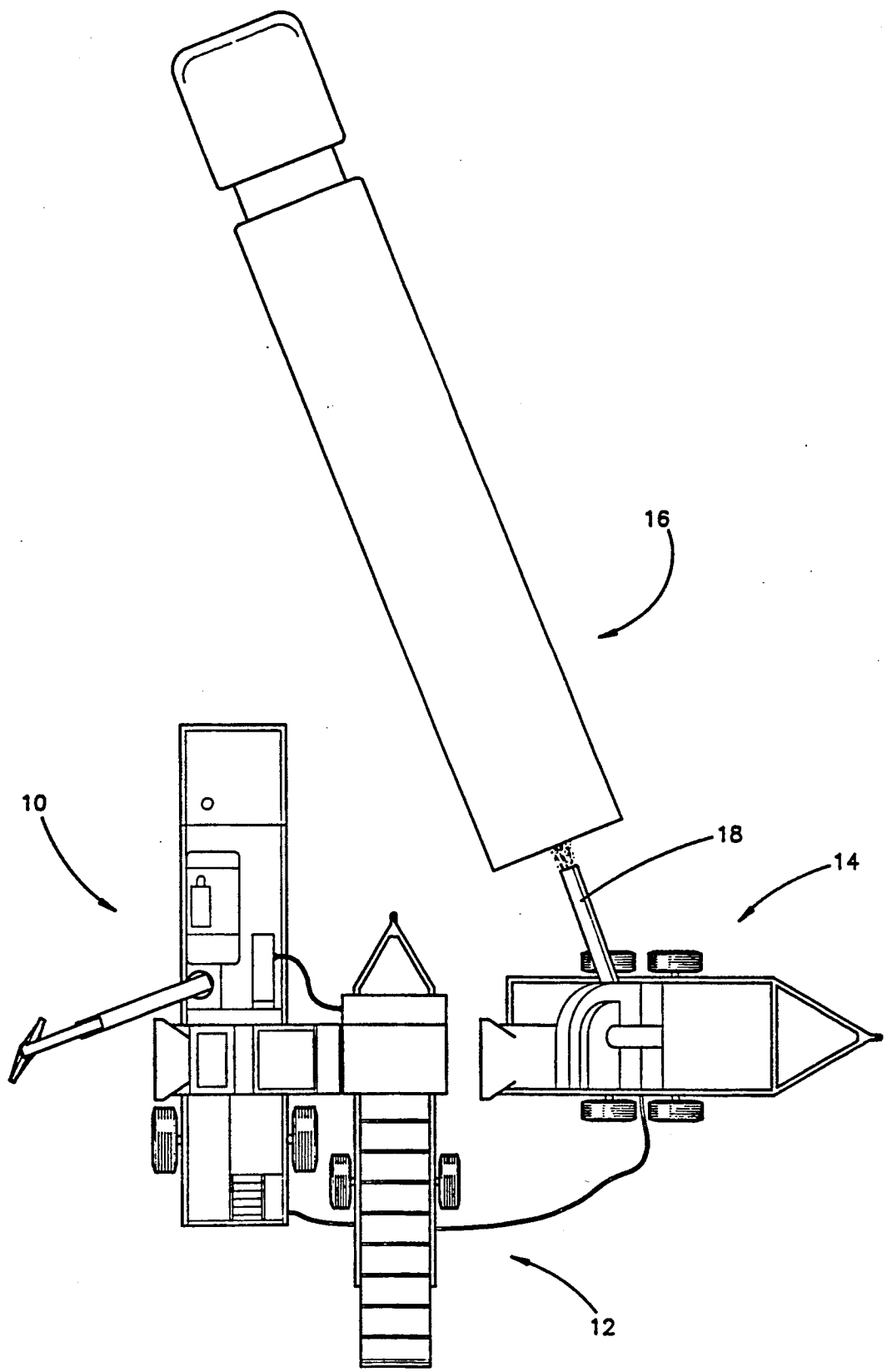
FIG. 1 is a schematic representation in plan view of a chip production site incorporating the present invention.
Figure 2:
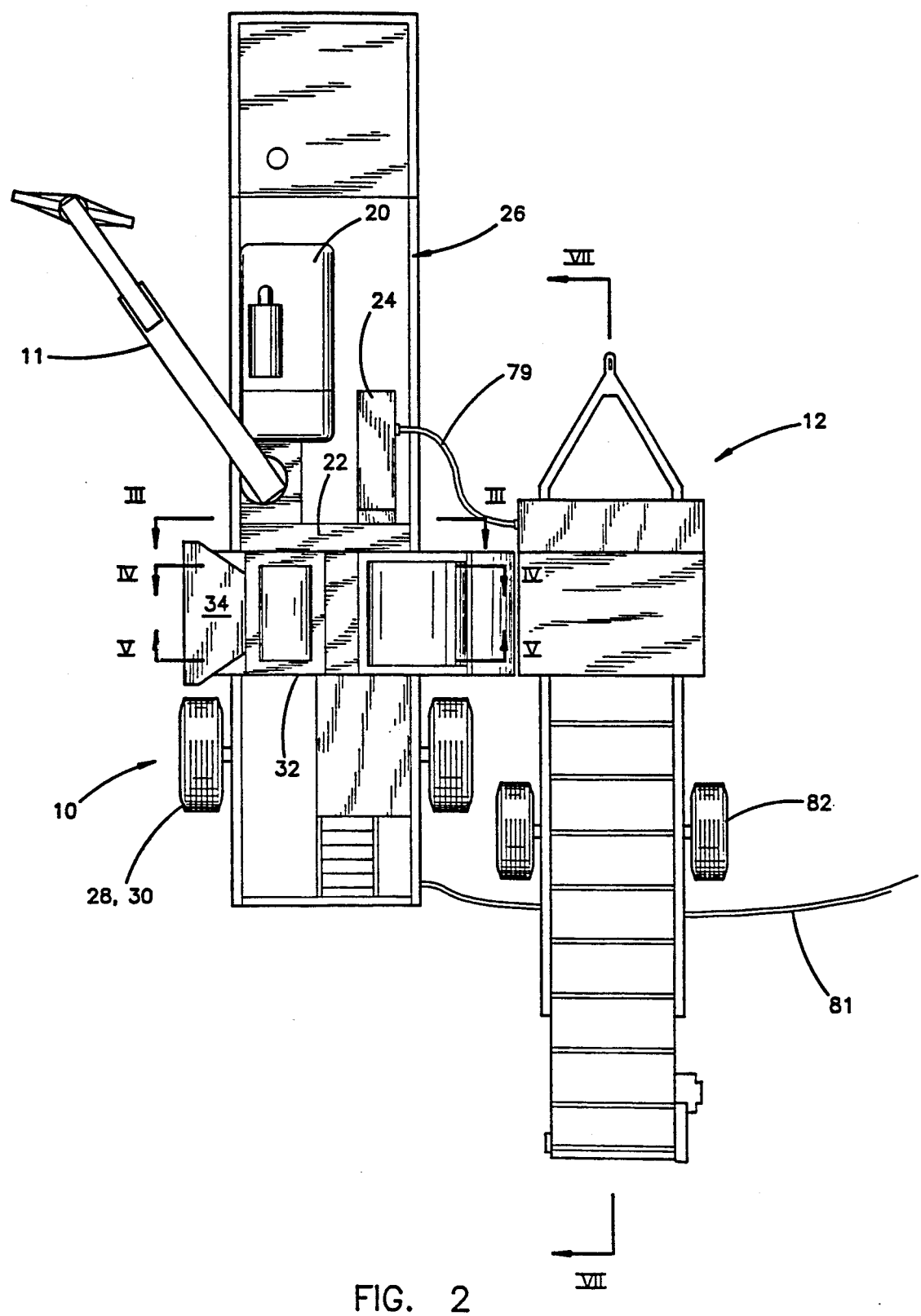
FIG. 2 is an enlarged plan view of a portion of the structure shown in FIG. 1.

A material stripper 10 and debris removal conveyor 12 according to the present invention are generally shown in FIGS. 1 and 2. On a typical chip production site, the debris removal conveyor 12 is positioned adjacent to and aligned with the discharge side of material stripper 10 and between stripper 10 and a material chipper 14. A semitrailer 16 is typically positioned near chipper 14 for receiving finished chips through a discharge chute 18 of chipper 14.

Stripper 10 preferably has a crane 11 for feeding trees and other material into stripper 10 and is powered by an operating engine 20. An improved drive system, namely belt drive transmission 22, is used on stripper 10 for transferring power from engine 20 to the stripping elements as described below. Also, an auxiliary power take-off is provided on transmission 22 for powering a hydraulic power pump 24.

Material stripper 10 is preferably portable and provided with a frame 26, wheels 28 and a suspension 30, all adapted for trailering. Stripper 10 also includes a housing 32 mounted on frame 26. Housing 32 defines a material flow path through stripper 10 from an infeed chute 34 and through a discharge 36 (FIGS. 2-5). Stripper 10 preferably has driven upper and lower infeed rollers 38 and 40 (FIGS. 4 and 5) for feeding material through stripper 10 as described in greater detail in U.S. patent application Ser. No. 07/527,041, filed on May 21, 1990, now U.S. Pat. No. 5,060,873, and entitled WOOD CHIP SEPARATOR and issued on Oct. 29, 1991 to Strong, the disclosure of which is incorporated herein by reference. Stripper 10 also preferably includes a driven paddle wheel-type roller 41, located near discharge 36, for transferring material and debris out of stripper 10 while projecting the delimbed and debarked tree horizontally outwardly above the smaller debris.

Figure 4:
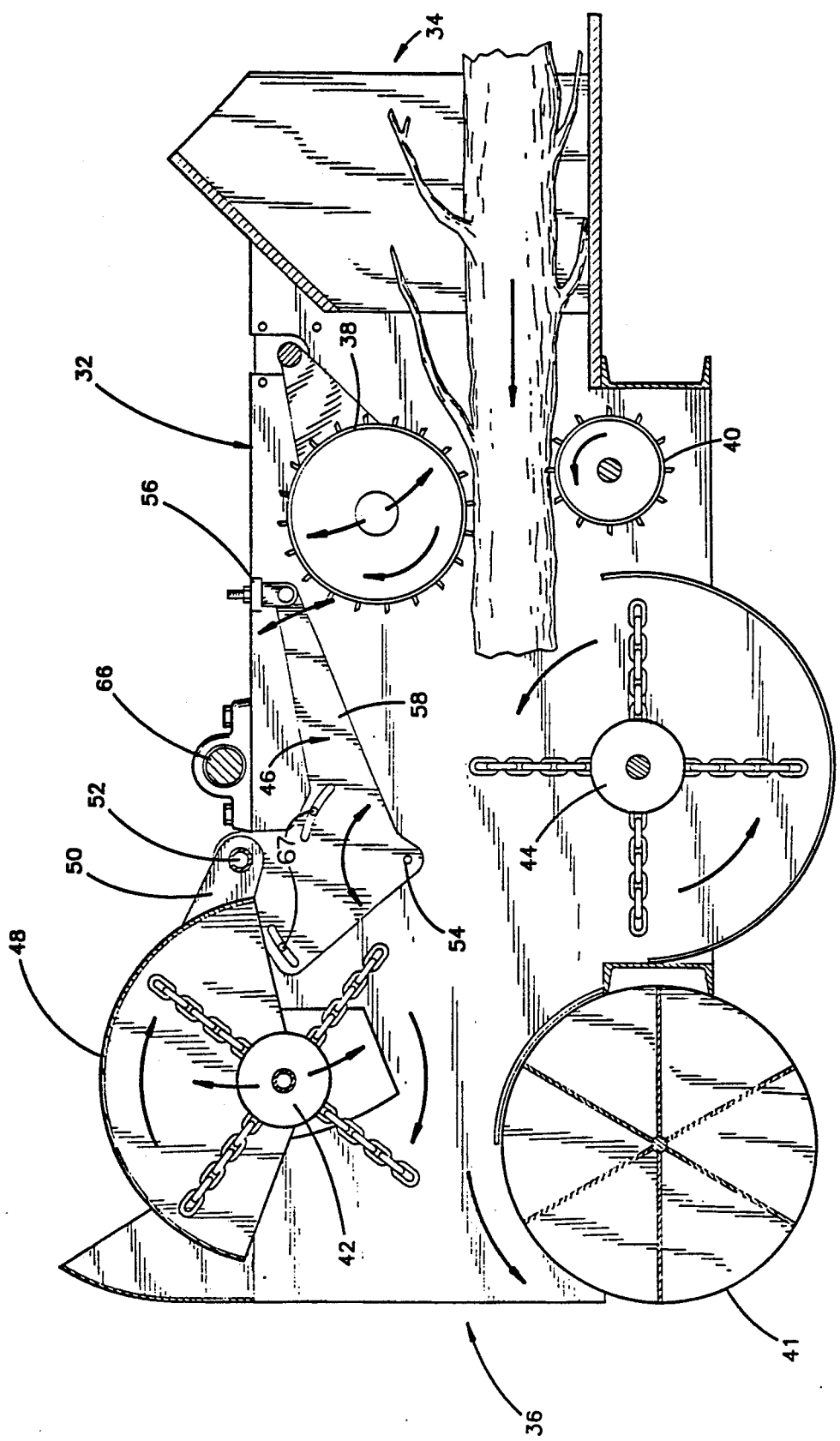
FIG. 4 is an enlarged cross-sectional view of the stripper of FIG. 2, taken along section line IV—IV of FIG. 2.
Figure 5:
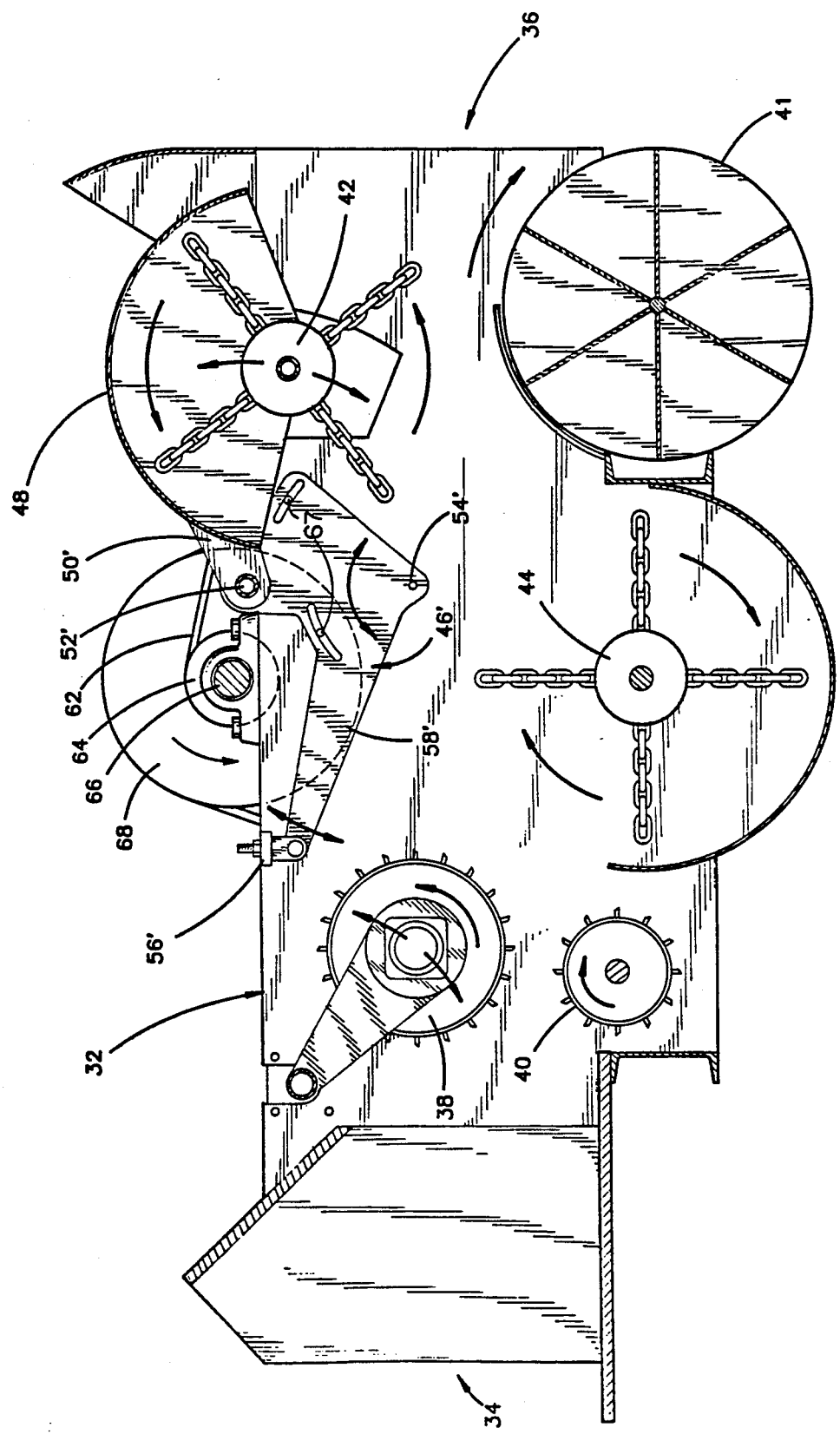
FIG. 5 is an enlarged cross-sectional view of the stripper of FIG. 2, taken along section line V—V of FIG. 2.

An upper stripping element 42 and a lower stripping element 44 are positioned on opposite sides of the material flow path and rotate about generally parallel axes (FIGS. 4 and 5). Upper element 42 is pivotally mounted to housing 32 by a pair of belt tightener levers 46, 46'. Upper element 42 is pivotally mounted to accommodate a variety of material sizes by "free floating" to climb over large material and to drift down to accommodate small material. Upper element 42 may also be positioned by a pneumatic or hydraulic cylinder, or the like, which is indexed to the position of the upper infeed roller 38 which also "floats" and thus use the material infeed device as a gauge for sizing material fed through stripper 10.

Upper element 42 is rotatably mounted in a generally cylindrically shaped safety housing 48 which is provided with mounting arms 50, 50' by which housing 48 and upper element 42 are pivotally mounted to housing 32 by tightener levers 46, 46'. Each mounting arm 50, 50' is pivotally connected with a tightener lever 46, 46' at a pivot 52, 52'. Each tightener lever 46, 46' is pivotally mounted to housing 32 at a pivot 54, 54' and has a screw adjustment device 56, 56' pivotally connected at the end of an arm 58, 58'.

Figure 3:
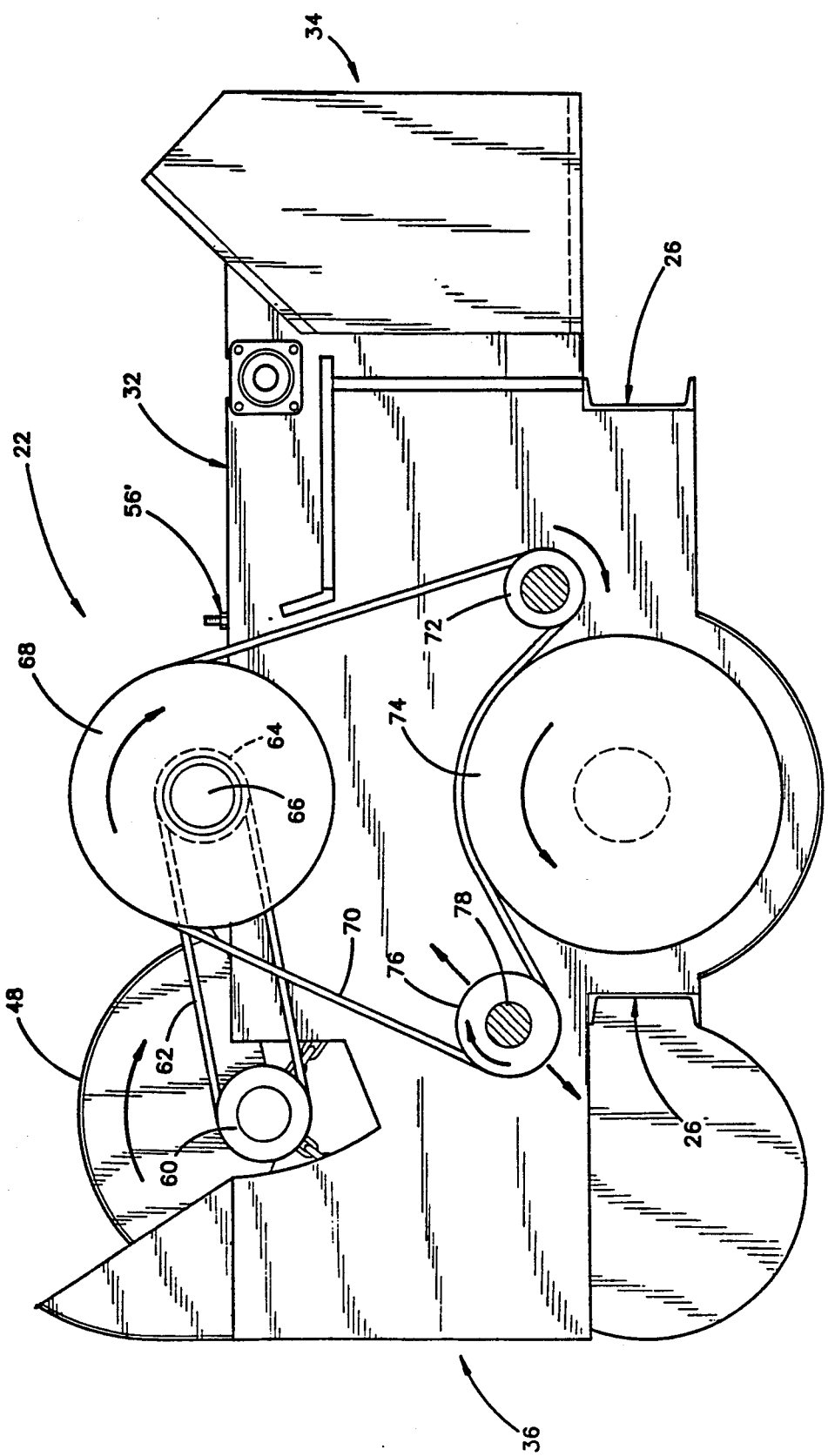
FIG. 3 is an enlarged cross-sectional view of the stripper shown in FIG. 2, taken along section line III—III of FIG. 2.

Upper element 42 is powered by a belt and drive wheel arrangement with a drive wheel 60 connected with upper element 42 (FIGS. 3 and 4). An upper drive belt 62 connects between drive wheel 60 and a drive wheel 64. Drive wheel 64 is mounted on a transfer shaft 66 and is connected with a drive wheel 68. Transfer shaft 66 is located on housing 32 near pivots 52, 52'. The tension of belt 62 is adjusted by screwing adjustment devices 56, 56' to pivot tightener levers 46, 46' about pivots 54, 54' and adjust the relative distance between drive wheel 60 and drive wheel 64 (FIGS. 4 and 5). Once adjusted, tightener levers 46, 46' may be secured to housing 32 by bolts 67.

Drive wheel 68 is driven by a continuous loop serpentine belt 70 (FIG. 3), which is preferably a series of double V-belts, the number of belts used being a function of the geometry of drive wheels 72, 74, and 76 to provide proper traction between belt 70 and drive wheel 74. While double V-belts are preferably used because of the high drive speeds required, one skilled in the art may find cogged or chain belts to be appropriate for a specific application of the invention. Belt 70 is looped around drive wheel 68, around a drive wheel 72, between drive wheel 72 and a drive wheel 74, between drive wheel 74 and an adjustment wheel 76, and around adjustment wheel 76 to drive wheel 68. By using serpentine belt 70, threaded through the path described, drive wheel 68 and drive wheel 74 are rotated in opposite rotational directions. Drive wheel 68 is connected through drive wheel 64, belt 62 and drive wheel 60 to upper element 42 to drive the element 42 in the same rotational direction as drive wheel 68. Drive wheel 74 is connected with lower element 44, driving the element 44 in the same rotational direction as drive wheel 74. Thus, the stripper elements 42, 44 are driven in opposite rotational directions, preferably in phase with the direction of flow of material through stripper 10.

Adjustment wheel 76 is slidably mounted with respect to frame 26 in a conventional manner for adjusting the tension of belt 70 (FIG. 3). Adjustment wheel 76 is also located so that in combination with drive wheel 72, belt 70 is wrapped around drive wheel 74 to provide proper driving contact between belt 70 and drive wheel 74. Drive wheel 72 is also the drive pinion for the belt drive transmission 22 and is connected through a commonly known clutch arrangement with engine 20 (FIG. 2).

Adjustment wheel 76 is connected with a power take off shaft 78 and provides an auxiliary power take off for driving hydraulic power pump 24 (FIG. 2). Pump 24 is preferably used to power the various conveyor rollers 38, 40, and 41, and to power debris removal conveyor 12 by connection of hydraulic hoses 79. A second hydraulic pump (not shown) which is directly connected with engine 20 is preferably used to power material handling crane 11. By use of a control line 81, stripper 10 and chipper 14 may be connected so that chipper 14 may be controlled from stripper 10 and only one operator is required to operative stripper 10, conveyor 12, and chipper 14.

Debris removal conveyor 12 provides a conveyor for removal of debris from between the stripper 10 and the chipper 14. Material may be fed through conveyor 12 in either direction. That is, while conveyor 12 is shown in FIGS. 1 and 2 in a given orientation relative to stripper 10 and chipper 14, conveyor 12 may also be rotated 180 according to the preferences of the particular chip production site operator.

Figure 6:
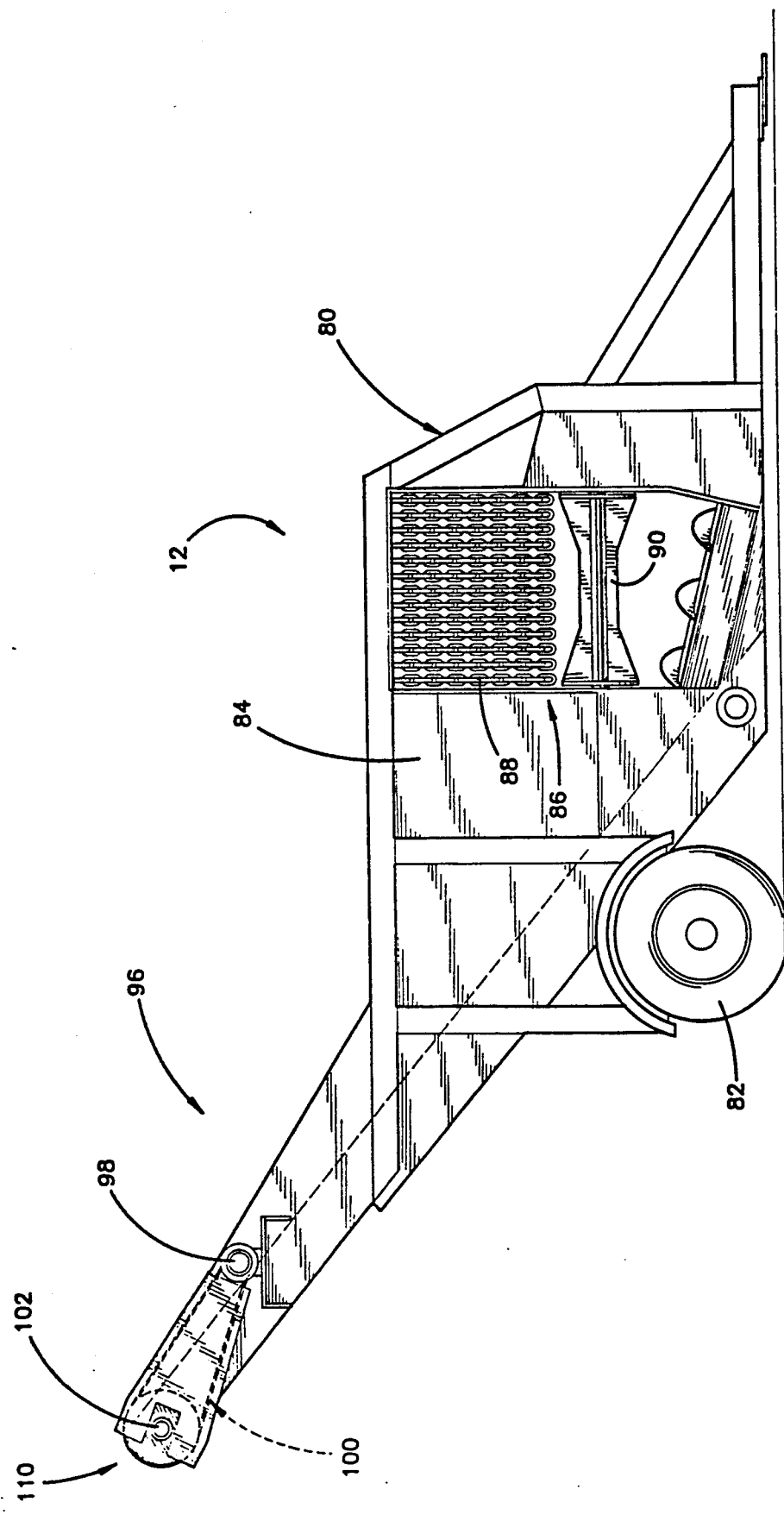
FIG. 6 is a side elevational view of the debris removal apparatus shown in FIG. 2.

Conveyor 12 is also preferably portable and provided with a frame 80, wheels 82 and a suspension (not shown), all adapted for trailering (FIGS. 2 and 6-8). Conveyor 12 has a housing 84 built in cooperation with frame 80 in a unit body construction to form the structure of conveyor 12. A material feed opening 86 is provided on each side of housing 84 for passing material from the stripper 10, through conveyor 12, and into chipper 14. Material feed openings 86 are aligned with each other on opposing sides of housing 84, defining a material flow path through conveyor 12. A chain curtain 88 is provided across each opening 86 (FIG. 6). Chain curtain 88 helps to wipe debris from material as it passes through conveyor 12 and also provides a safety feature of catching airborne material or debris.

Figure 7:
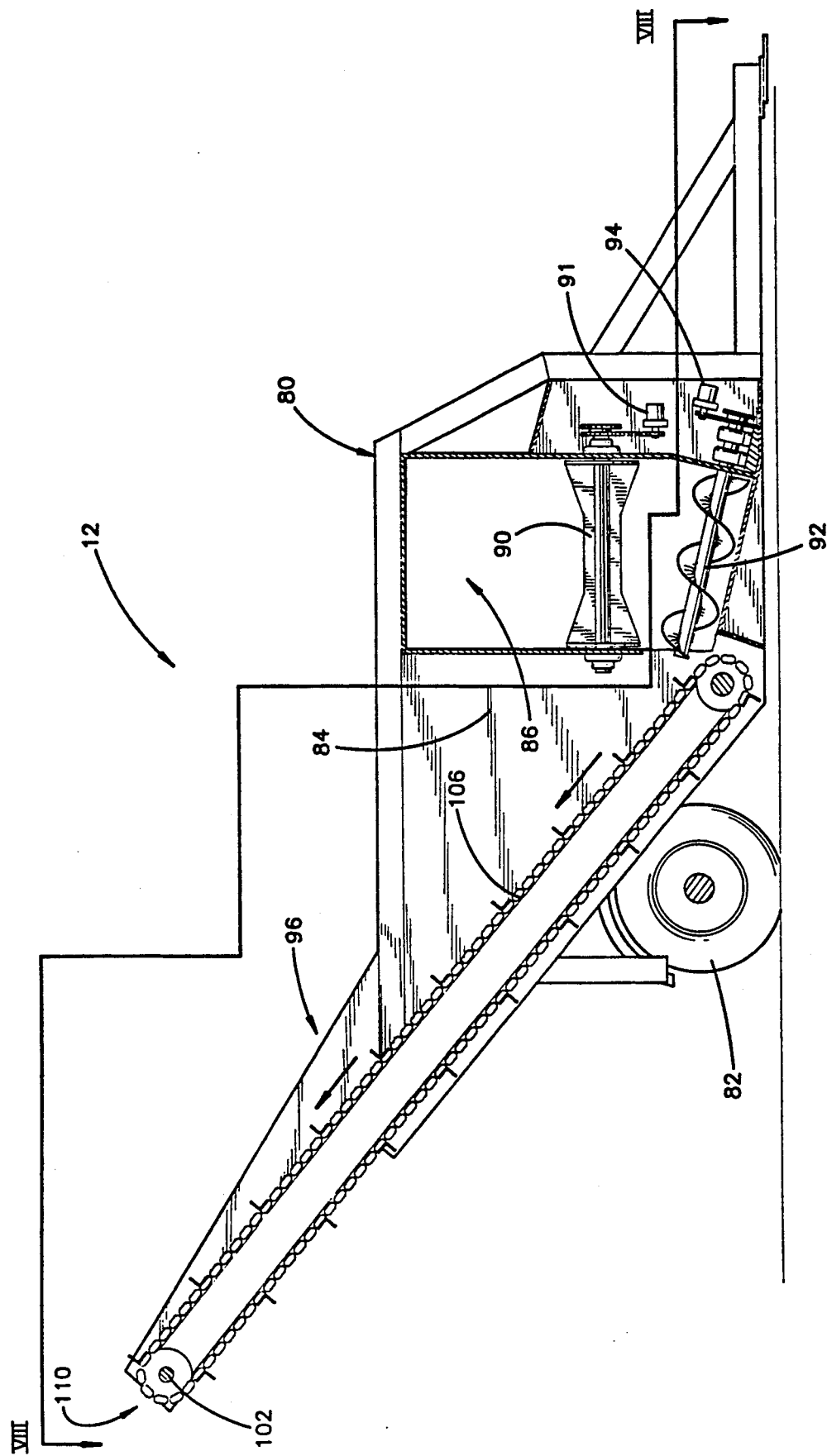
FIG. 7 is a centerline vertical cross-sectional view of the debris removal apparatus of FIG. 2, taken along section line VII—VII of FIG. 2.
Figure 9:
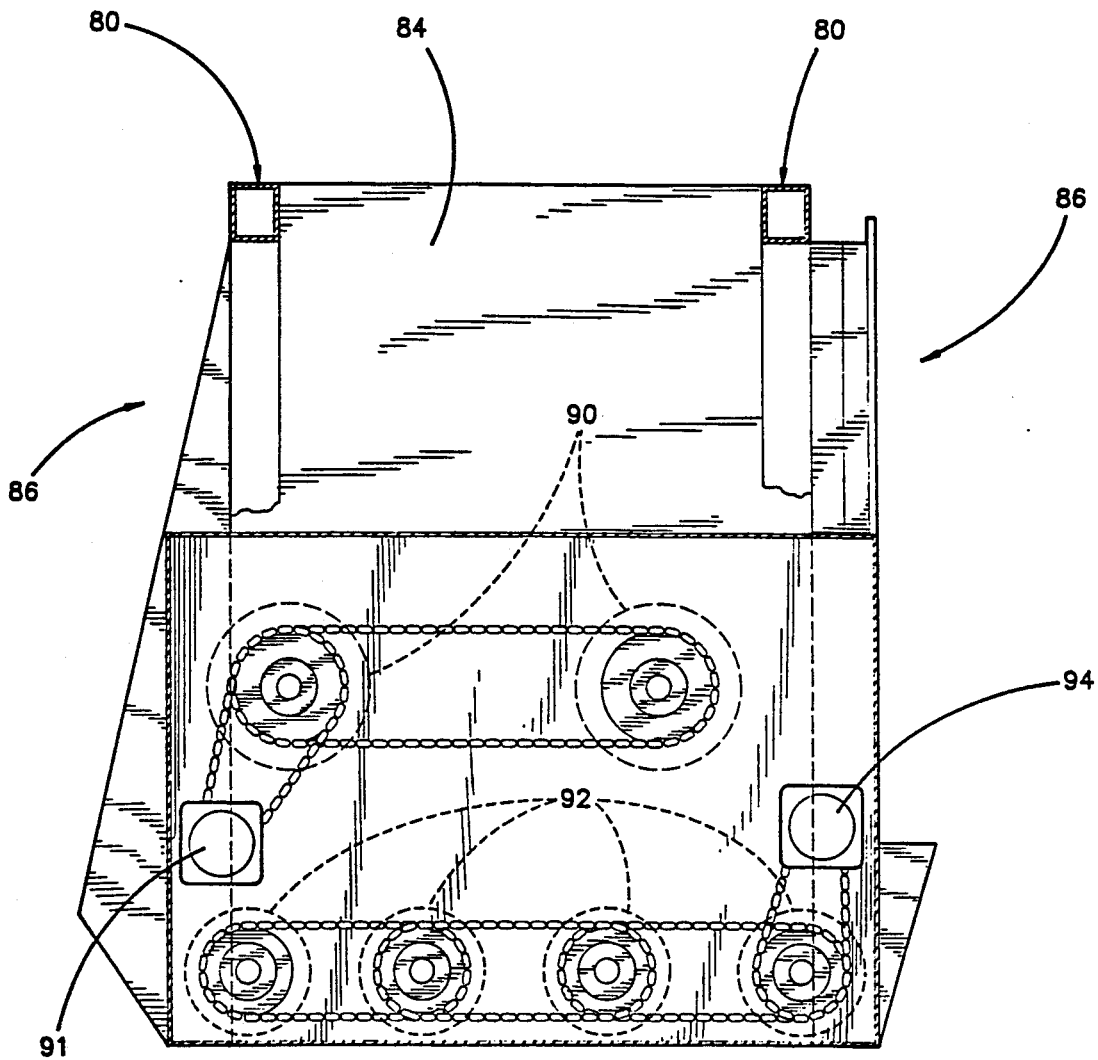
FIG. 9 is a cross-sectional view of the debris removal apparatus of FIG. 2, taken along section line IX—IX of FIG. 8.
Figure 10:
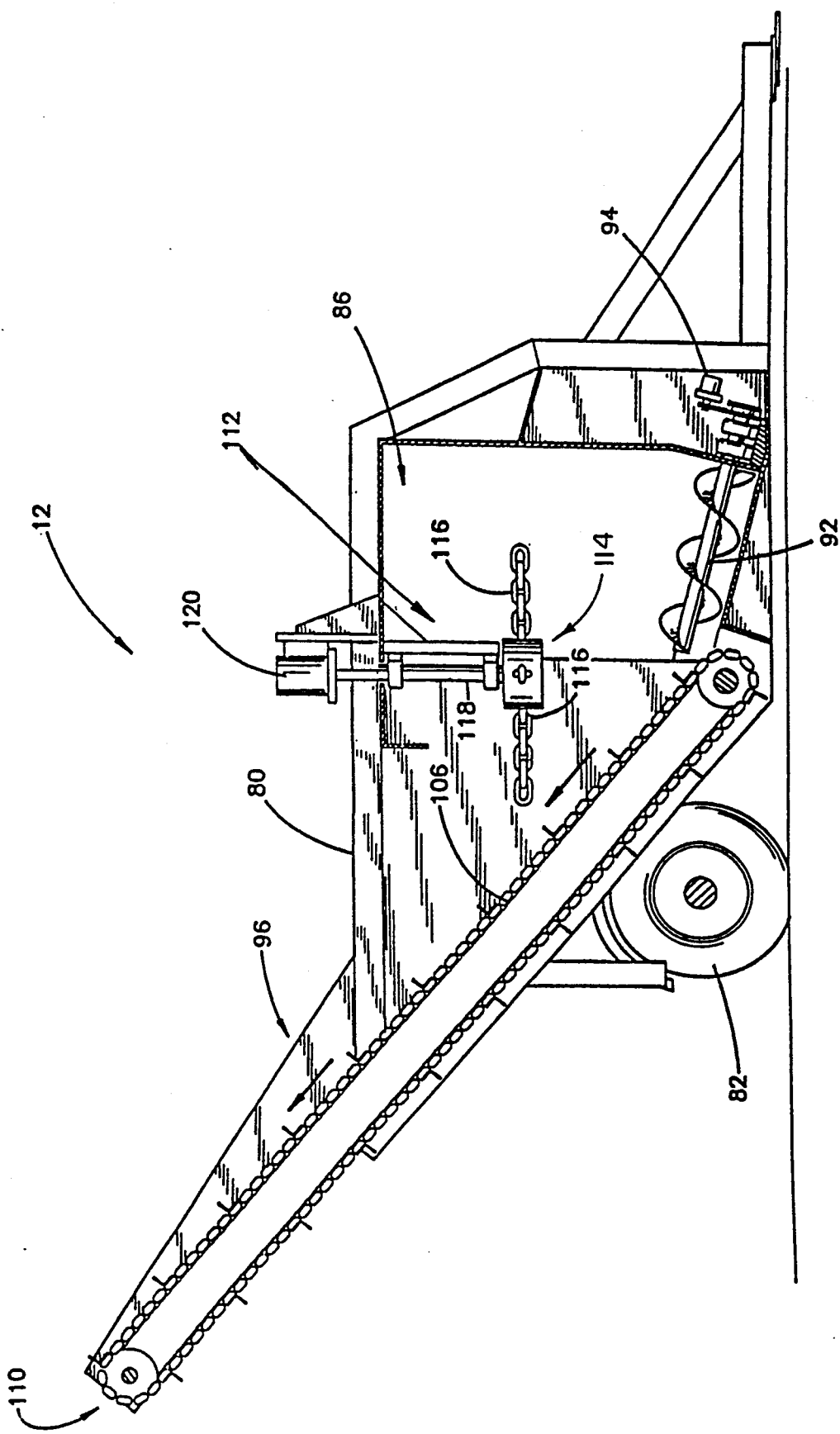
FIG. 10 is a vertical cross-sectional view of an alternative embodiment of the debris removal apparatus.

A pair of powered paddle wheel rollers 90 may be provided for feeding material through conveyor 12 (FIGS. 6 and 7). Rollers 90 are preferably driven by a hydraulic motor 91 which is preferably connected with and powered by pump 24 on stripper 10. Rollers 90 are chain driven by motor 91 as is commonly known (FIG. 9). The paddle wheel configuration of rollers 90 jostles material to shake debris from the material as it passes through conveyor 12. However, it is noted that this invention may be satisfactorily practiced without rollers 90, merely relying upon the stripper 10 and chipper 14 to feed material. Alternatively, depending upon the specific use of conveyor 12, it may be preferable to remove rollers 90 and install a debris clearing device, such as a flail 112 or the like, in conveyor 12 to further break up the debris and minimize potential jamming or clogging of debris (FIG. 10). Flail 112 has a small, rotary chain flail head 114, preferably with four chain flails 116 rotating opposite to the direction of travel of material through conveyor 12. Head 114 is driven through a shaft 118 by a hydraulic motor 120. Motor 120 is also preferably connected with and powered by pump 24 on stripper 10.

The use of debris removal conveyor 12, with its housing 84, between stripper 10 and chipper 14 provides an added safety element to the chip production site operation insofar as housing 84 encloses a significant portion of the material flow path of the operation, thereby reducing exposure of personnel to moving material and enhancing safety.

Figure 8:
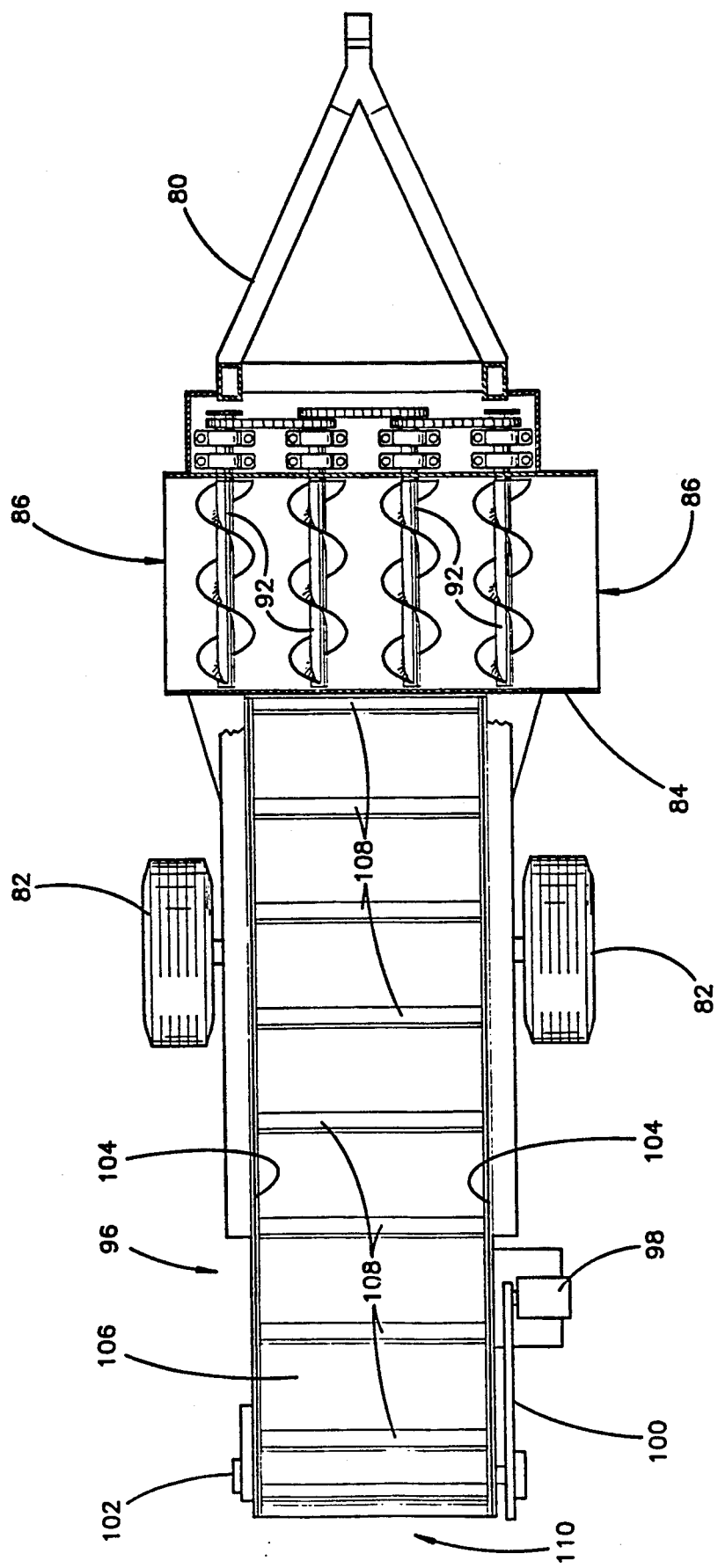
FIG. 8 is a cross-sectional view of the debris removal apparatus of FIG. 2, taken along section line VIII—VIII of FIG. 7.

A series of augers 92 is located under the material flow path through conveyor 12 and forms a first portion of the debris conveyor (FIGS. 7 and 8). Augers 92 are preferably hydraulically driven by a hydraulic motor 94 which is preferably connected with and powered by pump 24 on stripper 10 (FIG. 2). Augers 92 are chain driven by motor 94 as is commonly known and move debris from under the material flow path to a second portion of the conveyor, namely a belt conveyor 96 (FIGS. 6-8). Augers 92 may be fixed at each end of the auger but are preferably cantilevered to allow free movement of debris from under the material path to belt conveyor 96.

Belt conveyor 96 is also preferably hydraulically driven by a hydraulic motor 98 which is also connected with a chain drive 100 to belt conveyor 96 and is preferably powered by pump 24 on stripper 10. Power is delivered from the chain drive 100 to a drive shaft 102 which in turn drives a pair of conveyor chains 104 which border each side of a conveyor slide 106 (FIG. 8). A series of conveyor cleats 108 extend between chains 104 and are positioned generally perpendicularly to the length of conveyor slide 106 to push debris from augers 92, along slide 106, and off a discharge end 10 of debris removal conveyor 12 (FIGS. 7 and 8). Belt conveyor 96 extends generally upwardly and away from augers 92, moving debris from between the stripper 10 and chipper 14 to a vehicle such as a trailer which may be positioned under discharge end 110 of conveyor 12 or to fall on the ground where the debris is readily accessible for subsequent removal.

The above description is considered that of the preferred embodiments only. Modifications of the invention will occur to those skilled in the art and to those who make or use the invention. Therefore, it is understood that the embodiments shown in the drawings and described above are for illustrative purposes and are not intended to limit the scope of the invention which is defined by the appended claims.

The embodiments of the invention in which an exclusive property or privilege is claimed are defined as follows:

1. A debris removal apparatus for use in wood chip production, between a material stripping apparatus and a material chipping apparatus, comprising:
   a housing defining a path for the movement of material from the stripper to the chipper, said housing being separate and apart from the stripping apparatus; and
   a debris conveyor located under the path and extending away from the path.

2. A debris removal apparatus for use in wood chip production, between a material stripping apparatus and a material chipping apparatus, comprising:
   a housing defining a path for the movement of material from the stripper to the chipper; and
   a debris conveyor located under the path and extending away from the path, said debris conveyor having a first portion which moves debris from under the path to a second portion of said debris conveyor which moves debris generally away from the path.

3. The apparatus defined in claim 2 wherein said first portion includes at least one auger having an axis of rotation positioned generally perpendicular to the path.

4. The apparatus defined in claim 3 further including a material conveyor located between the path and said debris conveyor for feeding material through said apparatus.

5. The apparatus defined in claim 4 wherein said material conveyor includes means for jostling material conveyed thereby for removing debris from the material.

6. The apparatus defined in claim 3 further including means located between the path and said debris conveyor for clearing clogged material and debris.

7. The apparatus defined in claim 6 wherein said means for clearing clogged material and debris is a rotary flail device.

8. The apparatus defined in claim 6 further including trailer means for transporting said apparatus.

9. The apparatus defined in claim 8 further including a power source operatively connected therewith.

10. The apparatus defined in claim 8 wherein one of the stripper and the chipper has a power source and said apparatus is operatively connected therewith.

11. A debris removal apparatus for use in wood chip production, between a material stripping apparatus and a material chipping apparatus, comprising:
    a housing defining a path for the movement of material from the stripper to the chipper;
    a debris conveyor located under the path and extending away from the path; and
    a trailer for transporting said apparatus.

12. A debris removal apparatus for use in wood chip production, between a material stripping apparatus and a material chipping apparatus, comprising:
    a housing defining a path for the movement of material from the stripper to the chipper;
    a debris conveyor located under the path and extending away from the path; and
    a power source operatively connected with the debris removal apparatus.

13. A debris removal apparatus for use in wood chip production, between a material stripping apparatus and a material chipping apparatus, comprising:
    a housing defining a path for the movement of material from the stripper to the chipper; and
    a debris conveyor located under the path and extending away from the path;
    one of the stripper and the chipper including a power source and said apparatus being operatively connected with said power source.

14. The combination of a material stripping apparatus and a debris removal apparatus comprising:
    a material stripping apparatus having a housing defining a first path for the movement of material through said material stripping apparatus, material stripping means adjacent said first path for removing debris from the material, and a first power source operatively connected therewith; and
    a debris removal apparatus for receiving material and debris from said material stripping apparatus, said debris removal apparatus having a housing defining a second path aligned with said first path for the movement of material from said material stripping apparatus through said debris removal apparatus, and having a debris conveyor extending away from said second path, from under said second path.

15. The combination defined in claim 14 wherein said debris conveyor has a first portion for moving debris from under said second path to a second portion of said debris conveyor and has a second portion for moving debris generally away from said second path.

16. The combination defined in claim 15 wherein said first portion includes at least one auger having an axis of rotation positioned generally perpendicular to said second path.

17. The combination defined in claim 16 wherein said debris removal apparatus further includes a material conveyor located between said second path and said debris conveyor for feeding material through said debris removal apparatus.

18. The combination defined in claim 17 wherein said material conveyor is adapted to jostle material conveyed thereby for removing debris from the material.

19. The combination defined in claim 16 wherein said debris removal apparatus further includes means for clearing clogged material and debris from said second path and said first portion.

20. The combination defined in claim 19 wherein said means for clearing clogged material and debris is a rotary flail device located between said second path and said first portion.

21. The combination defined in claim 19 wherein said debris removal apparatus further includes wheels, suspension means and a frame adapted for transporting said debris removal apparatus.

22. The combination defined in claim 21 wherein said debris removal apparatus further includes a second power source operatively connected therewith.

23. The combination of claim 21 wherein said debris removal apparatus is operatively connected with said first power source.

24. The combination defined in claim 21 wherein said material stripping means has first and second rotary stripping elements positioned on opposite sides of said first path through said material stripping apparatus and each of said first and second rotary stripping elements has an axis of rotation, each said axis extending generally perpendicularly from a reference plane, said reference plane being positioned near said first path.

25. The combination defined in claim 24 wherein:

a first drive wheel is operatively connected with said first rotary stripping element and is generally located in said reference plane;
a second drive wheel is operatively connected with said second rotary stripping element and is generally located in said reference plane;
a third drive wheel is operatively connected with said first power source and is generally located in said reference plane;
an adjustment wheel is generally located within said reference plane;
said adjustment wheel and said third drive wheel are generally positioned on opposing sides of said second drive wheel; and
a drive belt is threaded between said adjustment wheel and said second drive wheel, around said second drive wheel, between said second drive wheel and said third drive wheel, around said third drive wheel, around said first drive wheel, and around said adjustment wheel to mechanically connect said drive wheels and said adjustment wheel so that said adjustment wheel, said first drive wheel, and said third drive wheel rotate in the same rotational direction and said second drive wheel rotates in a direction opposite thereto.

26. The combination defined in claim 25 wherein said drive belt is at least one double "V-belt".

27. The combination defined in claim 25 wherein said adjustment wheel provides an auxiliary power take off and said debris removal apparatus is operatively connected with said auxiliary power take off.

28. The combination defined in claim 25 wherein said adjustment wheel is operatively connected with a hydraulic drive pump and said debris removal apparatus is operatively connected with said pump.

29. The combination defined in claim 14 wherein said debris removal apparatus further includes wheels, suspension means and a frame adapted for transporting said debris removal apparatus.

30. The combination defined in claim 14 wherein said debris removal apparatus further includes a second power source operatively connected therewith.

31. The combination of claim 14 wherein said debris removal apparatus is operatively connected with said firs power source.

32. The combination defined in claim 14 wherein said material stripping means has first and second rotary stripping elements positioned on opposite sides of said first path through said material stripping apparatus and each of said first and second rotary stripping elements has an axis of rotation, said axis extending generally perpendicularly from a reference plane, said reference plane being positioned near said first path.

33. The combination defined in claim 32 wherein:
a first drive wheel is operatively connected with said first rotary stripping element and is generally located in said reference plane;
a second drive wheel is operatively connected with said second rotary stripping element and is generally located in said reference plane;
a third drive wheel is operatively connected with said first power source and is generally located in said reference plane;
an adjustment wheel is generally located within said reference plane;
said adjustment wheel and said third drive wheel are generally positioned on opposing sides of said second drive wheel; and
a drive belt is threaded between said adjustment wheel and said second drive wheel, around said second drive wheel, between said second drive wheel and said third drive wheel, around said third drive wheel, around said first drive wheel, and around said adjustment wheel to mechanically connect said drive wheels and said adjustment wheel so that said adjustment wheel, said first drive wheel, and said third drive wheel rotate in the same rotational direction and said second drive wheel rotates in a direction opposite thereto.

34. The combination defined in claim 33 wherein said adjustment wheel provides an auxiliary power take off and said debris removal apparatus is operatively connected with said auxiliary power take off.

35. A material stripping apparatus comprising:
a housing defining a path for the movement of material through said material stripping apparatus;
material stripping means adjacent said path for removing debris from the material;
a power source for operating said apparatus; and
a serpentine belt drive transmission for transferring power from said power source for the operation of said apparatus.

36. The apparatus defined in claim 35 wherein said material stripping means has first and second rotary stripping elements positioned on opposite sides of said path and each of said first and second rotary stripping elements has an axis of rotation, each said axis extending generally perpendicularly from a reference plane, said reference plane being positioned near said path.

37. The combination defined in claim 36 wherein said serpentine belt drive transmission includes:
a first drive wheel is operatively connected with said first rotary stripping element and generally located in said reference plane;
a second drive wheel is operatively connected with said second rotary stripping element and generally located in said reference plane;
a third drive wheel is operatively connected with said power source and generally located in said reference plane;
an adjustment wheel is generally located within said reference plane; said adjustment wheel and said third drive wheel being generally positioned on opposing sides of said second drive wheel; and
a drive belt is threaded between said adjustment wheel and said second drive wheel, around said second drive wheel, between said second drive wheel and said third drive wheel, around said third drive wheel, around said first drive wheel, and around said adjustment wheel to mechanically connect said drive wheels and said adjustment wheel so that said adjustment wheel, said first drive wheel, and said third drive wheel rotate in the same rotational direction and said second drive wheel rotates in a direction opposite thereto.

38. The apparatus defined in claim 37 wherein said adjustment wheel provides an auxiliary power take off from said transmission.

* * * * *

UNITED STATES PATENT AND TRADEMARK OFFICE
CERTIFICATE OF CORRECTION

PATENT NO. : 5,193,597

DATED : March 16, 1993

INVENTOR(S) : Donald E. Strong

It is certified that error appears in the above-identified patent and that said Letters Patent is hereby corrected as shown below:

Column 6, lines 3 and 4;

"(Fig. 9)" should be --(Fig. 10)--.

Column 6, line 52;

"end 10" should be --end 110--.

Column 9, line 47;

"firs" should be --first--.

Column 10, line 37;

"combination" should be --apparatus--.

Column 10, line 39;

After "wheel" delete --is--.

Column 10, line 42;

After "wheel" delete --is--.

Column 10, line 45;

After "wheel" delete --is--.

UNITED STATES PATENT AND TRADEMARK OFFICE
CERTIFICATE OF CORRECTION

PATENT NO. : 5,193,597
DATED : March 16, 1993
INVENTOR(S) : Donald E. Strong It is certified that error appears in the above-identified patent and that said Letters Patent is hereby corrected as shown below:

Column 10, line 48;

After "wheel" delete --is--.

Column 10, line 52;

After "belt" delete --is--.

Title page, item [57,
In the Abstract:

Line 13;

"incluldes" should be --includes--.

Signed and Sealed this

Twenty-sixth Day of April, 1994

Attest:

BRUCE LEHMAN

*Attesting Officer*     *Commissioner of Patents and Trademarks*